Jan. 19, 1954     D. O. DIAZ     2,666,285

LATIGO RIGGING FOR SADDLES HAVING SKIRTS

Filed March 14, 1952

INVENTOR.
Domingo O. Diaz
BY Scott L. Nowiel
ATTORNEY

Patented Jan. 19, 1954

2,666,285

UNITED STATES PATENT OFFICE 2,666,285

LATIGO RIGGING FOR SADDLES HAVING SKIRTS

Domingo O. Diaz, Phoenix, Ariz.

Application March 14, 1952, Serial No. 276,517

6 Claims. (Cl. 54—44)

This invention concerns latigo rigging for saddles having skirts.

Heretofore latigos were attached to rigging mounted on or attached to the top saddle trees. This type of rigging was made in many forms, but all forms had the common fault, that the rigging was on top of the saddle tree and pulled down on the tree and forced the tree rails onto the horse's back. The back of the animal was not only subjected to the weight of the rider and the saddle, but also to the binding of the cincha as tightened by the latigos. Extensive padding was always necessary to prevent damage to the horse's back.

In the view of the foregoing, one of the objects of the present invention is to provide a rigging structure for saddles which is attached to and made part of the skirts which, in turn, are attached to the under surfaces of the saddle trees;

A second object is to provide a saddle rigging which includes skirts attached to the under side of the rails of the saddle tree, and latigo attaching bars set in notches attached to the skirts and held in notches adjacent the lower edges of the skirts on both sides of the saddle;

Still another object is to provide a saddle tree with skirts, which are firmly attached to the under side of the tree rails; then to reinforce the lower edge portions of the skirts with an additional layer of leather, and form notches at desired positions along the bottom side edges of the skirts, and attach latigo bars to the skirt by placing their ends between the skirt leather and the reinforcing material and secure the ends by rivets extending through both leathers and bars so that the mid portions of the bars extend across notches formed in the edges of the skirts, thus making D rings unnecessary, and making the tension of the cincha to which the latigos attach apply directly to the skirts, and not to the saddle tree;

A further object is to provide a saddle tree having skirts attached beneath its rails with latigo bars disposed adjacent the lower edges of the skirts, so that when the skirts are attached to the cincha by latigos looped over the bars on the skirt, the latigos and cincha will hold the skirts firmly on the horse's back and the tree will ride on top of the skirts, being held to the skirts by suitable means of attachment.

Other objects will appear hereinafter.

I attain the foregoing objects by means of the structure, devices, and combination of parts shown in the accompanying drawings, in which—

Similar numerals refer to similar parts in the several views.

Figure 1:
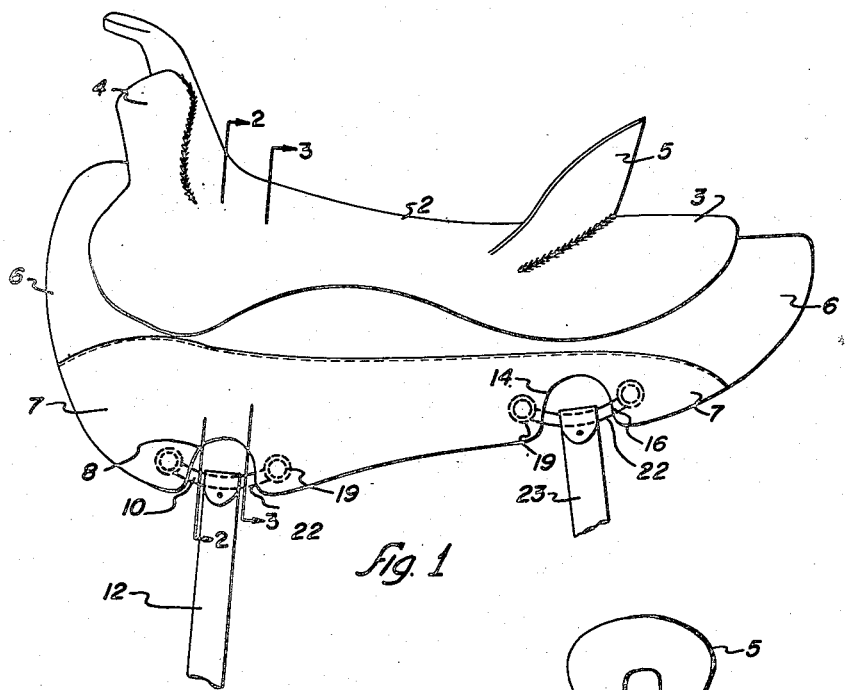
Figure 1 is a side elevation of a saddle tree equipped with saddle tree skirts provided with my improved rigging.
Figure 2:
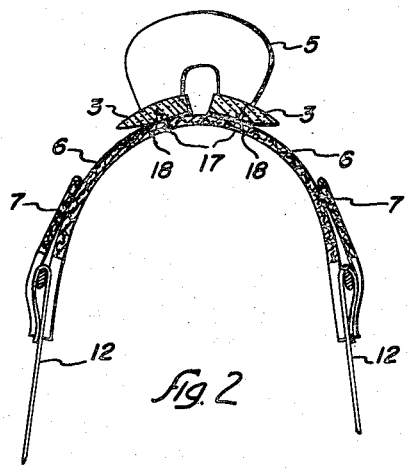
Figure 2 is a transverse section thereof taken substantially on line 2—2, Figure 1.
Figure 3:
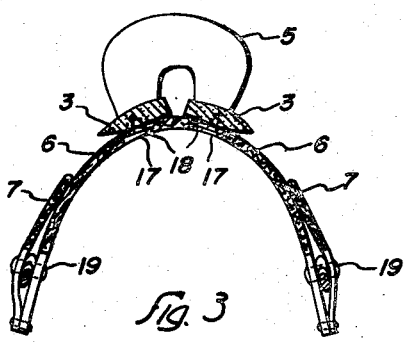
Figure 3 is a transverse section taken substantially on line 3—3, Figure 1.
Figure 4:
Figure 4 is a side elevation of one of the latigo bars drawn on a somewhat enlarged scale.

In the drawings numeral 2 refers to the saddle tree, in general; numeral 3 indicates the longitudinally extending rails of the saddle tree; 4 indicates the pommel; 5 the cantle; and 6 the skirts attached to the under faces of rails 3.

A reinforcing strip of leather 7 is sewed onto the outside of the lower parts of each skirt to add strength and stiffen the lower edge portion thereof. A notch 8 is formed in the lower edge of each skirt at a position alined with the base of the rear portion of the pommel. These notches are to receive breast latigos 12, and are bridged by latigo bars 10 over which these latigos are attached. In a similar manner notches 14 are formed in the lower edges of the rear portions of the skirts to provide recesses for the flank latigo bars 16. These notches are also bridged by latigo bars 10 to which and over which the flank latigos 23 are attached.

Skirts 6 are attached to rails by screws 17 driven through the leather of the upper skirt portion and reinforced by metal washers 18. Additional means of attachment, such as saddle maker's nails may also be used if desired.

Bars 10 are attached to the skirts by rivets 19 which extend through the loops 20 in each end of each bar, and through the skirt leather and through the reinforcing leather 7. The loops at the ends of the bars are clamped between the skirt leather and the reinforcing leather and held by the rivets so that only their shanks 22 are exposed. These intermediate shank portions bridge and extend across notches 8 and 14 as shown particularly in Figure 1.

It is to be understood that both right and left skirts are counterparts and are notched and provided with latigo bars in the same manner.

The saddle is mounted by running right and left forward or breast latigos 12 through the notches 8 and over the bars 22 bridging these notches and downward through the end rings of a breast cincha (not shown). Similarly flank latigos 23 are attached to bar portions 22 of bars 16 bridging notches 14. These are attached to a flank strap, or looped through the end rings of a flank or rear cincha (not shown).

In cinching up the latigos the skirts are drawn down tightly on the horse's back. The bars of the tree, being attached to the upper faces of the skirts, hold the saddle tree firmly in place. The tension of the cincha is applied only to the skirts, and only the weight of the rider and the tree presses the rails down onto the horse's back. The muscles and skin of the horse's back are thus relieved of unnecessary tension, and rubbing and chafing caused when the saddle tree rails are cinched down hard on the horse's back, as in the case of ordinary rigging, is eliminated.

While I have shown a saddle tree and skirts provided with double rigging, it is to be understood that bars 10 may be positioned in notches formed in the skirts more nearly in the center of the rails and a single cincha rigging used. Also, whereas only a bare tree 2 has been shown, it is to be understood that the tree is to be covered and finished in the usual manner.

I claim:

1. Saddle rigging, including a saddle tree having rails, skirts attached to the underfaces only of said rails and extending downwardly and outwardly therefrom; latigo bars secured to the lower edge portions of said skirts and latigos, attached to said bars; said saddle tree riding upon said skirts so that its rails are not forced on to the horse's back when said skirts are cinched tight.

2. Saddle rigging, including a saddle tree having rails, skirts attached to the underfaces only of each of said rails so that said rails are free from cinching pressure, and extending downwardly and outwardly therefrom on opposite sides of said tree; latigo bars secured to the lower edge portions of said skirts, and disposed in transversely alined positions on the edges of opposite skirts; and latigos, adapted to attach to the end rings of a cincha attached to said bars.

3. Saddle rigging for saddles having trees with parallel, longitudinally extending rails including saddle skirts having their upper portions attached to the underfaces only of said saddle tree rails so that said rails are free from cinching pressure when said skirts are cinched tight on a horse's back and extending laterally downward and outward from said saddle tree; each of said skirts having notches formed in their lower edges in transversely alined positions; latigo bars having eyes at each end and intermediate shank portions attached by said eyes to the lower edges of said skirts so that said shanks bridge across the notches in said skirt edges; latigos secured to said shank portions of said bars and adapted to be looped over said bars and through said notches.

4. Saddle rigging for saddles having trees with parallel, longitudinally extending, rails including saddle skirts having their upper portions attached to the underfaces only of said saddle tree rails and extending laterally downward and outward from said saddle tree; each of said skirts having reinforcing leather strips secured along their lower portions, and each having notches formed in transversely opposite positions in their respective lower edges substantially alined with the portion of the saddle tree just rearward from the pommel; latigo bars having attaching loops at their ends and intermediate shank portions secured to the lower edges of said skirts so that said bar loops are disposed between the skirt and said reinforcing strip and said shank portion bridges the openings of said notches; latigos secured to the shank portions of said bars and adapted to loop through said notches when looped through the end rings of a cincha.

5. Saddle rigging for saddles having trees with parallel, longitudinally extending rails including saddle skirts having their upper portions attached to the underfaces only of said saddle tree rails and extending laterally downward and outward from said saddle tree; each of said skirts having reinforcing leather strips secured along their lower portions, and each having notches formed in transversely opposite positions in their respective lower edges substantially alined with the portion of the saddle tree just rearward from the pommel; and notches formed in the lower edges of each skirt, respectively, to provide spaces for the attachment of bars for flank latigos; latigo bars having attaching loops at their ends and intermediate shank portions secured to the lower edges of said skirts so that said bar loops are disposed between the skirt and said reinforcing strip and said shank portion bridges the openings of said notches; latigos secured to the shank portions of said bars and adapted to loop through said notches when looped through the end rings of a cincha.

6. Saddle rigging composed of saddle skirts for application to the back of a horse, extending outwardly and downwardly from the longitudinal center of the horse's back; latigo bars secured to the lower edges of said skirts, and latigos extending over said bars for attachment to cincha rings; and a saddle tree having rails resting on the top side only on said skirts and attached to each of said skirts, respectively, along the longitudinally extending central portion of each rail.

DOMINGO O. DIAZ.

References Cited in the file of this patent

UNITED STATES PATENTS

| Number | Name | Date |
| --- | --- | --- |
| 1,546,378 | Hamley | July 21, 1925 |
| 2,008,977 | Connolly | July 23, 1935 |